United States Patent [19]

Carr et al.

[11] Patent Number: 5,762,802
[45] Date of Patent: Jun. 9, 1998

[54] DILUTE ACID OXIDATION OF DINITROTOLUENE ALKALINE WASH WATER

[75] Inventors: Richard Van Court Carr, Allentown; Mark Shedrick Simpson, Germansville, both of Pa.

[73] Assignee: Air Products and Chemicals, Inc., Allentown, Pa.

[21] Appl. No.: 848,933

[22] Filed: May 1, 1997

[51] Int. Cl.$^6$ .................................................. C02F 1/72
[52] U.S. Cl. .......................... 210/626; 210/631; 210/694; 210/766; 210/909; 568/934
[58] Field of Search ............................. 210/626, 631, 210/694, 758, 766, 909; 568/932, 934

[56] References Cited

U.S. PATENT DOCUMENTS

| | | | |
|---|---|---|---|
| 3,458,435 | 7/1969 | Howe | 210/51 |
| 3,711,402 | 1/1973 | Zumbrunn et al. | 210/759 |
| 4,197,198 | 4/1980 | Watson et al. | 210/909 |
| 4,230,567 | 10/1980 | Larbig | 210/737 |
| 4,257,986 | 3/1981 | Milligan et al. | 568/934 |
| 4,361,712 | 11/1982 | Herman et al. | 568/934 |
| 4,482,769 | 11/1984 | Toseland et al. | 568/934 |
| 4,597,875 | 7/1986 | Carr et al. | 210/710 |
| 4,604,214 | 8/1986 | Carr et al. | 210/909 |
| 5,221,440 | 6/1993 | Miyagi et al. | 568/934 |
| 5,232,605 | 8/1993 | Baur et al. | 210/761 |

*Primary Examiner*—Peter A. Kruskoci
*Assistant Examiner*—Betsey J. Morrison
*Attorney, Agent, or Firm*—Mary E. Bongiorno

[57] ABSTRACT

A process for removing nitrocresols in a crude aqueous alkaline dinitrotoluene wash stream derived by nitration of toluene using a mixed acid technique followed by treatment with aqueous alkaline material in which the crude aqueous alkaline dinitrotoluene wash stream is mixed with a dilute oxidizing acid such as nitric acid, heated to 130° to 180° C. for a period of time required to reduce the nitrocresols to a level at which it does not precipitate from the mixed acidic wash stream at temperatures above about 60° C., and removing the remaining nitrocresols by conventional methods such as adsorption or activated sludge biotreatment.

12 Claims, No Drawings

DILUTE ACID OXIDATION OF DINITROTOLUENE ALKALINE WASH WATER

BACKGROUND OF THE INVENTION

Commercially, dinitrotoluene (DNT) is produced by the mixed acid nitration of toluene, the mixed acid being a mixture of concentrated nitric acid and concentrated sulfuric acid. The production of DNT is accompanied by the production of nitrophenolic by-products, such as nitrocresols and picric acid. It is common industrial practice to remove these nitrophenolic by-products by contacting the crude DNT stream with an alkaline material, e.g., an alkali metal carbonate or an alkali metal hydroxide, to form a purified DNT product and an aqueous alkaline by-product stream containing water soluble salts.

Nitrocresols are particularly toxic by-products and are of special concern in purifying and disposing of the aqueous alkaline by-product stream. Some purification methods, specifically directed to removal or reduction of nitrocresols, are described below:

U.S. Pat. No. 4,597,875 (Carr et al., 1986), discloses concentration of nitrocresols and picric acid contaminants by recycling the alkaline waste water through additional crude DNT product from the reactor. When the concentration of the water soluble salts of nitrocresols and picric acid is sufficient, an acid is added to the alkaline waste water, in a sufficient amount, to convert the water soluble contaminants to water insoluble contaminants that separate as an organic phase. The organic phase can then be separated from the aqueous phase and incinerated.

U.S. Pat. No. 4,482,769 (Toseland, 1984) discloses selective retention of 2,4-dinitro-o-cresol in the organic phase with the DNT by keeping the pH of the product stream from the nitration process between about 5.8 to 6.4 during contact with the aqueous alkaline material. Trinitro-o-cresol by-products are converted to water-soluble materials and removed with the aqueous phase. This method does not address the subsequent removal of the dinitrocresols from the product stream.

As environmental requirements have become more stringent with respect to the amount and kind of by-products that can be released into the environment, other methods have been developed for substantially reducing the by-product content of the aqueous waste stream from aromatic nitration processes, prior to discharge. For example, nitroaromatics, formed during the production of DNT, have been reduced by such methods as treatment with ozone, treatment with hydrogen peroxide and ferrous ion (Fenton's reagent), wet air oxidation, and catalytic wet air oxidation. All of these methods require stoichiometric consumption of costly oxidizing agents. In addition, wet air oxidation uses high temperatures and pressures and, thus, requires high capital equipment investments.

More recently, a method for treating nitration wastewater containing nitroaromatic compounds was disclosed in U.S. Pat. No. 5,232,605 (Bauer et al., 1993). The process for treatment of wastewater from nitrobenzene production consisted of contacting the waste stream with nitric acid at 180° to 350° C. and 40 to 250 bar pressure to reduce nitrophenols to below 1 ppm and substantially reduce the total organic carbon (TOC) content. These process conditions are severe and result in high energy costs.

The need remains for a technique which is cost effective and also provides an environmentally safe way to remove nitrocresols.

BRIEF SUMMARY OF THE INVENTION

The invention relates to a method of using dilute nitric acid to treat alkaline waste streams derived from production of dinitrotoluene (DNT), in order to reduce the nitrocresols content to a level at which no precipitate is formed under acidic conditions and the waste stream can be treated by conventional methods to remove remaining nitrocresols.

This process consists of contacting an alkaline wash water from a DNT process with a dilute oxidizing acid stream, especially dilute (1–4 wt %) nitric acid, to yield a mixed acid stream. The mixed acidic stream, having a pH of about 3 or less, is then heated to 130° C. to 180° C., for a time required to oxidize the nitrocresols and reduce the amount of remaining nitrocresols so that no precipitation occurs in the acid medium at temperatures above 60° C. The remaining nitrocresols are at a level at which they can be easily removed from the acidic stream using conventional methods, such as carbon adsorption or activated sludge biotreatment.

Advantages associated with this invention include:

Relatively mild process conditions (i.e., 1–4 wt % nitric acid concentration and 130° C. to 180° C. temperature) can be used to oxidize the nitrocresols.

Spent acid streams from the nitration process can be used in the oxidation process; and Removal of nitrocresols can be carried out at a temperature that prevents precipitation of both nitrocresols and residual DNT; thus simplifying purification of the acidic waste stream.

DETAILED DESCRIPTION OF THE INVENTION

In the manufacture of nitroaromatics, particularly dinitrotoluene (DNT), the aromatic compound is contacted under liquid phase conditions with a mixture of concentrated nitric and sulfuric acids. In this process, nitrophenolic by-products, such as, dinitrocresol, trinitrocresol, and picric acid, are produced. DNT containing nitroaromatic by-products are separated from the aqueous waste stream and contacted with an aqueous alkaline medium, such as alkali metal hydroxides, alkali metal carbonates and bicarbonates, and the like, to convert the nitroaromatic by-products, particularly cresols, to water soluble salts. The aqueous alkaline wash stream is then separated from the organic phase containing DNT product and subsequently treated to remove the unwanted by-products.

The concentration of nitrocresols in the aqueous alkaline wash stream can vary between 2,000 and 12,000 ppm. A typical alkaline waste stream, on one pass through crude DNT product, contains about 0.4 wt % nitrocresols. After treatment with a dilute oxidizing acid according to the method of this invention, the amount of nitrocresols can be reduced to about 0.12 wt %, based on the original alkaline wash stream.

According to the method of this invention, nitrocresols are oxidized and reduced by at least about 60%. By reducing the level of nitrocresols (corrected for dilution of the alkaline waste stream) to about 1500 ppm or less, preferably 1000 or less, precipitation of the nitrocresols is prevented at temperatures above 60° C. and subsequent removal of the nitrocresols from the homogeneous waste stream can be carried out by conventional methods, such as carbon adsorption or activated sludge biotreatment. The capability to reduce nitrocresols to a level at which they do not precipitate in an acidic medium above about 60° C. makes the process particularly useful in DNT production because the melting point of the DNT (a mixture of isomers, predominantly 2,4- and 2,6-DNT) is about 55° C. and will solidify below that temperature; thus further complicating the purification process.

Specifically, the aqueous alkaline wash stream is mixed with a dilute oxidizing acid solution. The preferred oxidizing acid is nitric acid since it is readily available in the spent acids of the nitration process. About 1 to 4 wt %, preferably about 1.5 to 3 wt %, oxidizing acid is used to produce a mixed acidic stream having a pH of less than about 3. A single oxidizing acid or a mixture of an oxidizing acid with other acids can be used. The spent acids from the nitration process, containing a mixture of nitric and sulfuric acids, is preferred for economic reasons.

The mixed acidic stream is heated to 130° to 180° C., preferably 140° to 160° C., for 30 to 120 minutes, preferably about 60 to 90 min.

The pressure at the start of the oxidation process is about 3.4 bar, i.e., the autogenous pressure of water at 150° C. During oxidation, the pressure increases, presumably due to the formation of carbon dioxide and nitrogen. In commercial processes, a back pressure regulator will hold the pressure during the process.

The invention will be further clarified by a consideration of the following examples, which are intended to be purely exemplary of the use of the invention.

EXAMPLE 1

Oxidation of Nitrocresols in Alkaline Wash Water with DNT Acid Wastewater

To a two-liter glass lined stainless steel autoclave was added 758 g of water containing 16.3 g of nitric acid and 15.9 g of sulfuric acid. The mixture was heated to 150° C. which increased the pressure from atmospheric pressure to about 3.4 bar. DNT alkaline wash water (400 g) was pumped into the stirred vessel with a diaphragm pump over 20 minutes. The oxidation reaction was allow to proceed an additional 60 minutes. During the oxidation, the pressure rose an additional 3.6 bar, indicating significant evolution of carbon dioxide and nitrogen. The reactor was then cooled, vented and emptied. Analysis of the treated waste water, by liquid chromatography, showed a drop in nitrocresols from 4130 ppm to 1210 ppm (corrected for dilution of the waste water). An analysis of total organic carbon (TOC) revealed a 48% reduction of TOC and analysis by GC-FID showed a 65% reduction in DNT concentration. The effluent was found to be homogeneous above 60° C.; i.e., sufficient nitrocresols were removed to preclude precipitation of the nitrocresols or residual DNT and thus facilitate removal of nitrocresols in a subsequent step.

COMPARATIVE EXAMPLE 2

Treatment of Mononitrobenzene (MNB) Alkaline Wash Water with MNB Acid Waste Water To a one-liter glass lined stainless steel autoclave was added 147 g of water containing 4.1 g of nitric acid and 4.0 g of sulfuric acid. The mixture was heated to 150° C. and then 103 g of MNB alkaline wash water containing 136 ppm of 2,6-dinitrophenol (2,6-DNP), 2520 ppm of 2,4-dinitrophenol (2,4-DNP), 752 ppm of picric acid, and 1000 ppm of MNB, was pumped into the stirred vessel with a diaphragm pump in 20 minutes. The reaction was allowed to proceed an additional 60 minutes. The reactor pressure did not change during this time, indicating that no oxidation had occurred. Absence of oxidation was confirmed by the following analyses:

Liquid chromatography revealed that 2,6-DNP was non-detectable, 2,4-DNP was reduced to 242 ppm and picric acid increased to 2859 ppm; MNB concentration was unchanged. All concentrations were corrected for dilution of the alkaline wash water. Total organic carbon analysis revealed no change in the carbon content. Analysis using $^{13}C$ NMR verified that picric acid was, in fact, being produced.

COMPARATIVE EXAMPLE 3

Control Experiment with DNT Alkaline Wash Water

An aqueous solution containing 3036 ppm nitrocresol, in a stainless steel autoclave, was heated to 150° C. Foe 60 minutes. Liquid chromatography analysis and TOC analysis indicated no change in the contents. These results indicate that the reaction resulting from the addition of nitric acid, as in Example 1, is an oxidation reaction and not thermal degradation or hydrolysis.

The data in Example 1 show that dilute nitric acid, at relatively mild temperature and pressure, can be used to substantially reduce the amount of nitrocresols and TOC in DNT alkaline wash water by oxidation. These results are quite unexpected in light of Comparative Example 2, since, under the same process conditions, nitrophenols in mono-nitrobenzene alkaline wash water are not oxidized and the amount of TOC is not reduced. Comparative Example 3 shows that an oxidizing acid is required in order to reduce the amount of nitrocresols and the TOC content of the alkaline wash water.

This invention is useful in removing nitrocresols, especially 3,4-dinitro-o-cresol, in the production of dinitrotoluene using a mixed acid process in which the crude product is treated with an alkaline medium.

What is claimed is:

1. In a process for removing nitrocresols in a crude aqueous alkaline dinitrotoluene wash stream, derived by nitration of toluene using a mixed acid technique followed by treatment with aqueous alkaline material, the improvement which comprises:

(a) mixing the crude aqueous alkaline dinitrotoluene wash stream with a dilute oxidizing acid stream, to produce a mixed acidic wash stream having a pH of about 3 or less;

(b) heating the mixed acidic wash stream to a temperature of 130° to 180° C., for a period of time required to oxidize the nitrocresols and create a heated acidic wash stream containing a level of nitrocresols of 1500 ppm or less, corrected for dilution of the dinitrotoluene alkaline wash stream, that does not precipitate at temperatures above about 60° C.; and (c) removing remaining nitrocresols from the heated acidic wash stream at temperatures above about 60° C.

2. The process of claim 1 wherein the dilute oxidizing acid stream of step (a) comprises 1 to 4 wt % nitric acid.

3. The process of claim 1 wherein the dilute oxidizing acid stream of step (a) comprises spent acids from the nitration of toluene.

4. The process of claim 3 wherein the temperature in step (b) is 150° to 160° C.

5. The process of claim 4 wherein the level of nitrocresols in step (b) is reduced below about 1000 ppm, corrected for dilution of the dinitrotoluene alkaline wash stream.

6. The process of claim 5 wherein removing remaining nitrocresols in step (c) is achieved using carbon adsorption or activated sludge biotreatment.

7. The process of claim 1 wherein the dilute oxidizing acid stream of step (a) comprises 1.5 to 3 wt % nitric acid.

8. The process of claim 7 wherein the temperature in step (b) is 150° to 160° C.

9. The process of claim 8 wherein the period of time of step (b) is 30 to 120 minutes.

10. The process of claim 9 wherein the period of time of step (b) is 60 to 90 minutes.

11. The process of claim 10 wherein removing remaining nitrocresols in step (c) is achieved using carbon adsorption or activated sludge biotreatment.

12. A process for removing nitrocresols in a crude aqueous alkaline dinitrotoluene wash stream, derived by nitration of toluene using a mixed acid technique followed by treatment with aqueous alkaline material, comprising:

(a) mixing the crude aqueous alkaline dinitrotoluene wash stream with a dilute oxidizing acid stream, to produce a mixed acidic wash stream having a pH of about 3 or less; and (b) heating the mixed acidic wash stream to a temperature of 130° to 180° C., for a period of time required to reduce the nitrocresols to a level at which the nitrocresols do not precipitate at temperatures above about 60° C.; and (c) removing remaining nitrocresols form the heated mixed acidic wash stream at temperatures above about 60° C.

* * * * *